Figure 9:
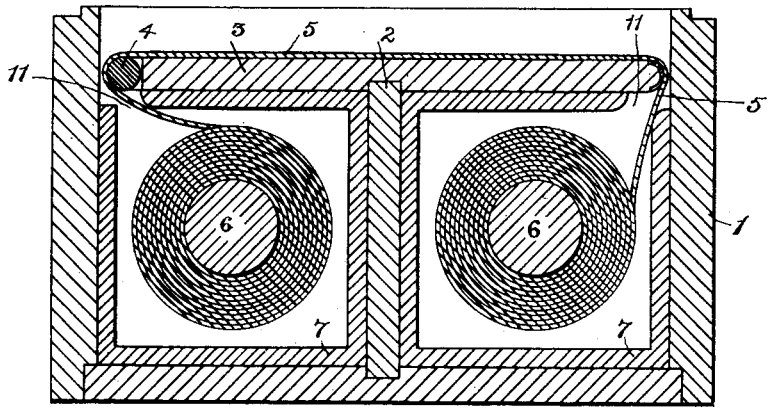

(No Model.) 2 Sheets—Sheet 1.
F. A. BROWNELL.
PHOTOGRAPHIC ROLL HOLDER.
No. 477,243. Patented June 21, 1892.
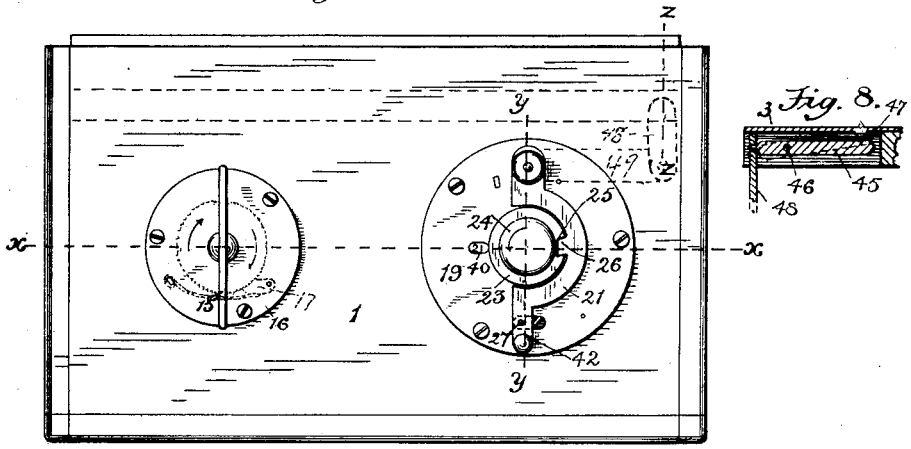
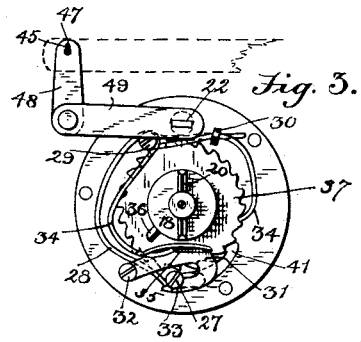
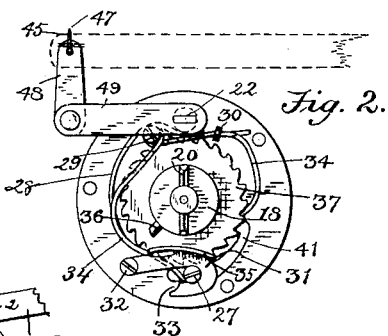
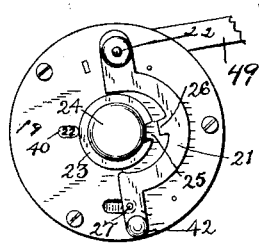
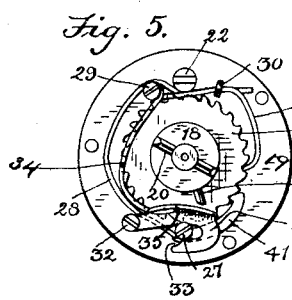
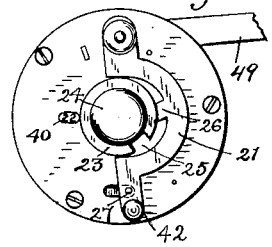
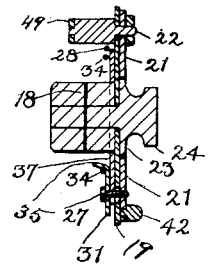
WITNESSES:
Thomas Durant
J. M. Fowler Jr.
INVENTOR
Frank A. Brownell
BY
Church & Church
ATTORNEYS.

(No Model.) 2 Sheets—Sheet 2.

F. A. BROWNELL.
PHOTOGRAPHIC ROLL HOLDER.

No. 477,243. Patented June 21, 1892.

WITNESSES:
Thomas Durant
J. M. Fowler Jr

INVENTOR
Frank A. Brownell
BY
Church & Church
ATTORNEYS.

UNITED STATES PATENT OFFICE.

FRANK A. BROWNELL, OF ROCHESTER, NEW YORK, ASSIGNOR TO THE EASTMAN COMPANY, OF SAME PLACE.

PHOTOGRAPHIC-ROLL HOLDER.

SPECIFICATION forming part of Letters Patent No. 477,243, dated June 21, 1892.

Application filed December 28, 1891. Serial No. 416,336. (No model.)

*To all whom it may concern:*

Be it known that I, FRANK A. BROWNELL, of Rochester, in the county of Monroe and State of New York, have invented certain new and useful Improvements in Roll-Holders for Photographic Film; and I do hereby declare the following to be a full, clear, and exact description of the same, reference being had to the accompanying drawings, forming a part of this specification, and to the reference-numerals marked thereon.

My present invention relates to the film carrying and feeding devices of roll-holders for photographic film, and has for its object to improve particularly the construction and operation of the measuring and arresting devices for arresting the operation of the feeding devices after a certain quantity constituting, preferably, a single exposure has been wound forward or in a position to be exposed in the camera; and to this and other ends the invention consists in certain improved constructions and combinations of parts, all as will be hereinafter described, and the novel features pointed out particularly in the claims at the end of this specification.

Figure 10:
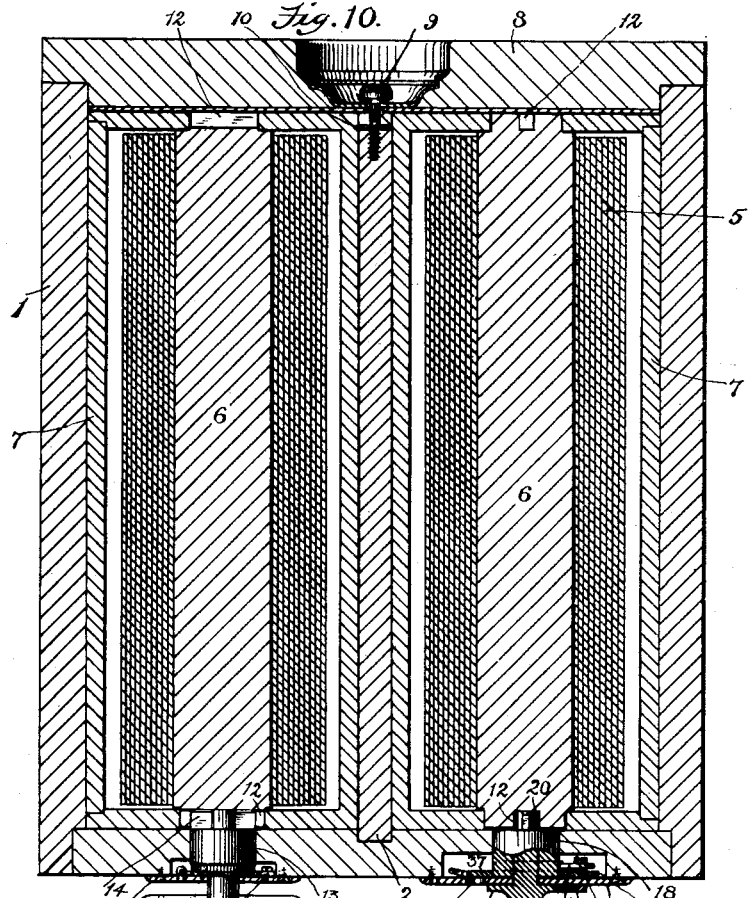

In the drawings, Figure 1 indicates a plan view of the exterior of a roll-holder embodying my invention and showing the position of the parts when the feeding devices are arrested. Fig. 2 is a view looking from the inside of the arresting devices in the same position. Fig. 3 is a similar view showing the parts after the winding mechanism is released. Fig. 4 is a view of the exterior parts when in the position shown in Fig. 3. Figs. 5 and 6 are respectively interior and exterior views of the locking device just before being arrested. Fig. 7 is a sectional view on the line $y\ y$ of Fig. 1. Fig. 8 is a sectional view on the line $z\ z$ of Fig. 1. Fig. 9 is a cross-sectional view of a roll-holder embodying my improvements; and Fig. 10 is a longitudinal sectional view of the same, taken on the line $x\ x$ of Fig. 1.

Similar reference-numerals indicate similar parts in the several figures.

The casing 1 is in the construction shown adapted to be applied to the back of a photographic camera of any desired construction, said casing being divided into two longitudinal compartments by means of a partition 2, to which is secured a film support or table 3, having at one edge a roller 4, while the other edge is rounded so that the film may be moved from one compartment over the table or support and back to the other without undue friction, and may be held, while the exposure is being made, perfectly flat upon the support.

The flexible photographic film 5 is in the present construction wound upon spools 6, supported in bearings in boxes or receptacles 7, adapted to be inserted in the compartment in the holder-casing, and the outer end of the casing is closed by a cover-plate 8, secured in position by means of a screw 9, adapted to be operated from the exterior of the casing and engaging a nut 10, secured to the partition-piece 2, or other suitable fastening devices could be employed. The boxes 7, containing the film-spools, are provided at one corner with a slit or passage 11 for the passage of the film into and out of the boxes. The ends of the spools are provided with slots 12 for the entrance of ribs or projections on the winding and measuring devices, as will be hereinafter explained.

The film winding or feeding devices consist in the present instance of an arbor 13, journaled in the casing end and having on its inner end a rib or projection 14, arranged to enter a corresponding groove 12 in the end of the spool, said arbor being provided on its outer end with an operating-handle 15 and secured in place by a plate 16, and also provided with the usual ratchet mechanism for preventing the movement of said arbor in but one direction, consisting of a pawl 17, thrown into engagement with a ratchet on the arbor 13 by a spring, as in dotted lines, Fig. 1. Arranged at the corresponding end of the other longitudinal compartment in the casing is an arbor 18, journaled in a plate 19 and provided on its inner end with a rib 20, arranged to enter the slot 12 in the end of the spool located in the compartment. It will be understood that the receptacle 7, containing a spool of unexposed film, is inserted in the compartment to the right of Fig. 9 and the end of the spool engaged with the arbor 18, and the film is extended over the support 13 and attached by any suitable means to the spool 6 in receptacle 7 in the other compartment, which roller is engaged with the key or handle 15 and that the revolution of the arbor 18 can be seen from the exterior of the holder.

In practice I make the length of the support 3 approximately equal to the circumference of the roll of film when containing half its normal quantity, so that each revolution of the supply-spool will indicate that approximately the quantity of film necessary for a single exposure has been moved forward over the support. Therefore if the supply-spool is arrested and the film is marked at the edge of the support 3 at each revolution of the supply-spool the operator will not be in any danger of winding forward more than the amount of film necessary for a single exposure, and he will be enabled by means of the designating-mark to sever the film into the separate exposures readily. Upon the outer side of the plate 19 is arranged a locking detent or lever 21, secured to an arbor 22, journaled in the plate 19 and extending around a collar 23, secured to the arbor 18, the latter having on its outer end a milled head 24. The collar 23 is provided with a recess 25 and the locking-detent 21 with a projection 26, adapted to enter said recess and arrest the rotation of the arbor and spool. At the forward or free end of the detent 21 is a screw or pin 27, extending through a slot in the plate 19 and operated upon by a spring 28, which is coiled around a screw 29, its outer end passing through a lug 30, secured to the under side of the plate 19. The tendency of this spring is to move the detent 21 in a direction to cause the engagement of the projection 26 with the recess 25, and if this projection rested normally on the periphery of the collar 23 the engagement would be effected and the supply-spool arrested at each revolution; but when the operator desires to release the locking mechanism in order to wind forward another exposure of film the projection would immediately drop back into the recess and prevent the winding operation, unless some means were provided for holding it out of engagement after being disengaged from the collar. In order to provide for this and to hold the detent out of engagement until just before another revolution of the spool is made, I provide a retaining-dog 31, pivoted at 32 to the under side of the plate 19 and provided with a slight notch 33, adapted to engage the pin 27 on the end of the detent 21, as shown in Figs. 2, 3, and 5. A spring 34 is passed around screw 29, one end engaging a flange 35 on the pawl 31 and pressing the latter toward the arbor in a direction to cause the engagement of the notch 33 with the pin 27. Arranged upon the arbor 18 is a pin 36, adapted when the arbor is rotated to engage the retaining-dog and move it in a direction to disengage the pin 27 and permit the projection 26 on the lever 19 to rest upon the collar 23. Journaled loosely upon the arbor 18 is a ratchet counter-disk 37, having upon its face next the plate 19 a series of figures indicating the number of exposures and visible one at a time through an aperture 40 in the plate 19. This disk is prevented from backward rotation by the end of the spring 34, which engages with it, constituting a pawl, and upon the pin 27, attached to the detent 21, is pivoted a pawl 41, said pawl being held in engagement with the wheel by the spring 28, which engages with its heel beyond its pivot and also moves the detent into engagement with the collar 23, so that when the detent or lever 21 is moved by its operating-handle 42 in a direction to disengage the projection 26 from the collar 23 the counter-disk or ratchet-wheel will be moved one tooth, showing another number through the aperture 40, and when the projection 26 on the lever 21 drops into the notch 25 the pawl 41 will move over the ratchet and engage the next succeeding tooth.

In order that the film may be properly marked after each exposure, so that it may be severed into separate negatives, I locate at one end of the film-support 3 a small lever 45, pivoted at 46 and having on its inner end a pin or projection 47, adapted to perforate the film from the rear side when the lever is moved on its pivot and extend the outer end of said lever through a perforation in the end of a link 48, pivoted to the end of the lever 49, rigidly secured to the arbor 22, the connection being such that when the locking-detent is thrown into engagement by its spring to arrest the spool and the arbor 22 rotated the lever 45 is turned on its pivot and the pin passed through the film, marking the latter at the edge.

The operation of the device will now be readily understood. A receptacle 7, containing a full spool of film, (preferably having pieces of black paper secured to the ends of the film, one of which is attached to the spool and the other extending out through a slot in the receptacle,) is placed in the chamber shown at the right in the drawings, and the slot in the end of the spool is engaged with the rib on the arbor 18, and another receptacle 7, having an empty spool 6 therein, is placed in the other chamber in the holder. The slot in its spool 6 is engaged with the rib of the winding-arbor. A piece of paper, being secured to this spool or roller, is extended through a slot in the receptacle up over the support 3 and connected with the piece on the supply-spool. Then the cover-plate 8 is secured in position by means of the screw 9, and the winding-arbor is turned until an exposure of film is drawn over the support 3, the movement necessary for this being determined by the length of the paper on the outer end of the film on the supply-spool. The film is now exposed in the camera in the usual manner, assuming that the film-spool was arrested when the first exposure was wound forward by the movement of the locking-detent outward, disengaging the projection 26 from the collar 23.

At the same time the notch 33 of the retaining-dog 31 engages the pin 27 and holds the lever 21 in the position shown in Figs. 3 and 4, so that it will not immediately drop back into engagement with the notch in the collar. Then the winding-arbor is turned in the direction of the arrow, Fig. 1, and a new exposure of film wound forward, and just before the rotation of the supply-spool is completed the pin 36 on the arbor engages the retaining-dog and moves it to the position shown in Fig. 5, allowing the projection 26 to rest on the periphery of the collar 23, as in Fig. 6, so that on the continued movement of the film and the rotation of the supply-spool the projection 26 will drop into its notch and arrest the movement of the spool, after which the film can be stretched or strained slightly so as to cause it to lie flat on the support 3, the backward movement being prevented by the pawl 17. When the detent 21 is moved to release the spool, the pawl 41, engaging the counter-disk 37, turns the latter one tooth and displays the next succeeding number through the aperture 40 in the plate 19, indicating the number of exposures and enabling the operator to readily determine how many are left, the numbers on the counter-disk corresponding to the number of exposures contained in a full spool. When the arbor is engaged by the detent, the film-marking device will be operated from the latter in the manner previously described.

While it is not necessary, I prefer to employ the milled head 24 on the supply-spool, so that, if necessary, the operator may move the spool slightly to put the film under tension by rotating the spool backward in the event of its becoming loose from any cause. While it is desirable to provide a disk 23, having a notch 25 engaged by the detent, this is not essential, as a single tooth or projection would perform the function of the side of the notch from which the arbor 18 moves, that could be engaged at the proper time by the projection 26 or its equivalent. This locking and counting device is cheap, readily applied, and has been found in practice admirably adapted for the purpose, and the measuring of the film into exposures by the rotation of the supply-spool is found to answer all practical purposes, though, of course, where large rolls of film are employed it is preferable to use a measuring-roll operated by the film. It will be understood that my invention could be as well applied to the measuring-roll of roll-holders of the ordinary or any preferred construction.

The use of pieces of black paper applied to the ends of film for protecting it when rolled up is well known in the art, and is described, for instance, in British Letters Patent No. 17,522, of 1889, and therefore specific illustration of it herein is deemed unnecessary.

I claim as my invention—

1. In a roll-holder, the combination, with the rotatable arbor movable with the film, of a movable detent engaging the arbor for arresting it, the retaining-dog for automatically engaging the detent and holding it out of engagement when released, and connections between the arbor and dog for disengaging the latter by the movement of the former, substantially as described.

2. In a roll-holder, the combination, with the rotatable arbor movable with the film, having the notched collar, of the locking-detent engaging said notch, the retaining-dog for automatically engaging the detent and holding it out of engagement when released from the notch, and the movable projection for actuating the dog and releasing the detent, substantially as described.

3. In a roll-holder, the combination, with the rotatable arbor movable with the film, having the notched collar, of the locking-detent engaging said notch, the retaining-dog for automatically engaging the detent and holding it out of engagement when released from the notch, and connections between the arbor and dog for releasing the latter and permitting the detent to engage the collar after the notch has moved away from the detent, substantially as described.

4. In a roll-holder, the combination, with the rotatable arbor movable with the film, having the notched collar, of the locking-detent, the counter-disk, the pawl engaging it connected to the detent, the retaining-dog for automatically engaging the detent and holding it out of engagement when released from the notch, and the movable projection operating the dog and releasing the detent, substantially as described.

5. In a roll-holder, the combination, with the arbor movable with the film, having the projection for engaging a spool and the notched collar, of the locking-detent engaging the notch, the retaining-dog automatically engaging the detent and holding it out of engagement when released from the notch, and the projection on the arbor releasing the dog and permitting the detent to engage the collar after the notch has moved away from the detent, substantially as described.

6. In a roll-holder, the combination, with the arbor movable with the film, the notched collar thereon, and the detent having the projection engaging the notch, of the spring for operating it and the film-marker connected to and operated by the movement of the detent, substantially as described.

7. In a roll-holder embodying a film-support, the combination, with the arbor movable with the film, of the detent engaging the same, the spring operating the detent, the pivoted film-marker on the film-support, the arm connected to the detent, and the link connecting said arm with the film-marker, substantially as described.

8. In a roll-holder, the combination, with the arbor movable with the film and the detent engaging the same, of the counter-disk having the teeth, the pawl on the detent engaging the counter, and the spring engaging the heel of the pawl and holding its end in engagement with the counter and operating in a direction to cause the engagement of the detent with the arbor, substantially as described.

9. The combination, with the arbor having the notch, the detent, and the spring for operating it, of the retaining-dog and its spring and the dog-releasing projection on the arbor, substantially as described.

10. The combination, with the arbor having the notch, the detent, and the spring for operating it, of the retaining-dog, the projection on the arbor for releasing it, the counter-disk on the arbor, and the pawl on the detent for actuating said disk, substantially as described.

11. The combination, with the arbor having the notch, the detent, the spring 28, and the pawl 41, of the retaining-dog, the releasing projection on the arbor, the spring 34, the lug 30, and the counter-disk, substantially as described.

12. The combination, with the casing, of the plate secured thereto, having the aperture 40, the arbor, the counter-disk on the arbor, the detent pivoted on the plate, having the operating-handle and engaging the arbor to arrest it, the pawl on the detent, the film-marker in the casing, and connections between the detent and film-marker, substantially as described.

13. In a film-holder, the combination, with the open-ended casing having the stationary film-support secured therein and the open-ended slots at the ends thereof for the passage of film, said support removed from the back or bottom, leaving a space behind it, of the end piece for the casing secured removably in position, whereby removable film rolls or boxes may be inserted endwise in the casing, with the film extending over the film-support, substantially as described.

14. In a film-holder, the combination, with the casing having the vertical partition and the stationary film-support secured thereto, forming two open-ended compartments, open-ended slots being left at the ends of the support, of the removable slotted boxes containing film adapted to be inserted endwise in the casing, with the film extending over the support and the end piece of the casing secured removably in position, substantially as described.

FRANK A. BROWNELL.

Witnesses:
WILLIAM B. HALE,
FRED F. CHURCH.